UNITED STATES PATENT OFFICE.

CASIMIR FUNK, OF NEW YORK, N. Y., ASSIGNOR TO C. F. BOEHRINGER & SOEHNE, OF MANNHEIM-WALDHOF, GERMANY.

ART OF PREPARING NITROGENOUS PRODUCTS FROM COD-LIVER OIL.

1,162,907. Specification of Letters Patent. Patented Dec. 7, 1915.

No Drawing. Application filed April 8, 1915. Serial No. 19,951.

*To all whom it may concern:*

Be it known that I, CASIMIR FUNK, citizen of Russia, residing at New York, N. Y., United States of America, have invented certain new and useful Improvements in the Art of Preparing Nitrogenous Products from Cod-Liver Oil; and I do hereby declare the following to be a full, clear, and exact description of the invention, such as will enable others skilled in the art to which it appertains to make and use the same.

Heretofore in obtaining vitamins and extracts containing a high percentage of vitamins, which substances are of great importance in medicine in the treatment with what are known as avitaminoses, yeasts and bran of rice, and several other vegetable substances have been employed.

I have made the surprising discovery that medicinally and dietetically valuable nitrogenous products may be isolated from cod-liver oil in relatively large yields and of a high degree of purity. Such a result was not to be anticipated for the very obvious reason that hitherto the medicinal properties of cod-liver oil were generally ascribed to the phosphorus-containing fatty substances contained in the same and that hence the aim has rather been to isolate these latter substances.

My method for the separation of vitamins, which is susceptible of many modifications, is based on the utilization of cod-liver oil as a starting material, and the removal therefrom of the therapeutically active substances by such separation methods as extraction or precipitation, thereby obtaining a residue from which the vitamins are obtained by the action of phospho-tungstic acid.

The first phase of the process consists in the preparation of an extract obtained by acting on the oil or, more directly, on the cod-liver with organic solvents or with dilute acids. For this purpose the cod-liver oil is extracted with a solvent, such as ligroin, ether or dilute alcohol, a fraction rich in vitamin being precipitated from the resultant solution by means of ethyl-acetate or acetone, the said fraction being taken up with a dilute acid and, where necessary, and hydrolyzed for a sustained period of time at elevated temperature. Or the extract may be obtained by shaking the oil with acidulated dilute alcohol, concentrating the extract, and taking up the concentrate with a dilute acid.

Still another way of proceeding under my invention is to hydrolyze the oil for a sustained period of time with a dilute acid, in the cold or with the application of heat, whereupon the acid extract is directly submitted to further treatment.

A still further modification of the process embodying my invention consists in first obtaining a precipitate from the oil, taking up such precipitate with organic solvents or with dilute acids and eventually hydrolyzing the same, the precipitate being obtained either by treating the oil with certain organic solvents, such as alcohol, methyl-alcohol, or benzene or by precipitating with a metal salt soluble in organic solvents.

The extract obtained from any one of these methods is thereupon submitted to the precipitating action of phospho-tungstic acid, whereby the major portion of the vitamins goes into the precipitate which is then separated by filtration. The filtrate contains only slight quantities of the effective substances.

The precipitate is decomposed with barium hydrate and the vitamins are then obtained therefrom by further purification steps, for example, by treating with nitrate of silver (see Funk in *Journal of Physiology*, vol. 45, p. 77). It is to be recommended to extract the precipitate due to the action of phosphotungstic acid with acetone by the process set forth in my concurrently filed application, Serial No. 19952. Thereby the active substances are practically all retained in the undissolved residue, which may thereafter be decomposed with barium-hydrate. In view of their sensitiveness to alkalis, it is, however, more advantageous to treat the residue containing the vitamins with acetate of lead. Upon thereafter separating the phosphotungstate of lead by filtration and removing the excess of lead acetate from the filtrate by the introduction of hydrogen sulfid and then carefully concentrating the final filtrate by evaporation *in vacuo*, a substance is obtained, the major portion of which consists of vitamins. The active substance thus obtained is contained in so small quantities in the starting material that its exact chemical identification is not possible with the methods at present available, to which must be added the fact that during the last stages of purification its stability is affected materially.

The physiological and pharmaceutical value of the substance has been ascertained by treating pigeons, fowls and rats with the same. It stimulates the growth of young rats kept on an artificial diet which, without the addition of this substance, would leave them completely stunted. This product, like the vitamins obtained from yeast and described in my concurrent application Serial No. 19,952, cures beri-beri in pigeons and moreover, is valuable in preventing rickets in young fowls kept under laboratory conditions, thus diminishing to a great extent the mortality among these animals.

Example 1: One kilogram of cod-liver oil is extracted with two liters of a solution consisting of 660 cubic centimeters of absolute alcohol, 50 cubic centimeters of concentrated hydrochloric acid and 1290 cubic centimeters of water. The resultant emulsion is separated, and the aqueous extract thus removed therefrom is then concentrated in vacuo until precipitation occurs and until such precipitation is completed. The said precipitate, consisting of a small quantity of a substance crystallizing in the form of needles, is then removed, leaving an oily residue. This oily residue, weighing about 20 grams is mixed with 100 cubic centimeters of 5 per cent. sulfuric acid, being then advantageously subjected to a hydrolyzing action of from 6 to 12 hours by heating in connection with a reflux cooler for from 6 to 12 hours, whereupon it is further treated by introducing 50 per cent. phosphotungstic acid. The resultant precipitate (weighing about 40 grams) is then ground in a mortar together with 100 cubic centimeters of acetone, the insoluble residue being then separated by filtration, then washed with acetone and finally mixed with a neutral solution of lead acetate. Having then separated the phosphotungstate of lead and thrown down the excess of lead from the filtrate by means of hydrogen sulfid and again filtered, the last filtrate is concentrated by evaporation in vacuo. The residue thus obtained contains all of the active ingredients.

Example 2: One kilogram of cod-liver oil is dissolved in one liter of ligroin and then precipitated by gradually adding acetic ester or acetone. After separating the precipitate by filtration, said precipitate is taken up with 100 cubic centimeters of 5 per cent. hydrochloric acid and then hydrolyzed for several hours with the aid of a reflux cooler. The product thus obtained is then precipitated by means of 50 per cent. phosphotungstic acid and the precipitate is then decomposed with barium-hydrate and then caused to undergo further purification by the action of silver nitrate (see *Journal of Physiology*, vol. 45, p. 77).

By the term "vitamins" as employed in the claims are to be understood not only vitamins strictly speaking, but also other nitrogenous physiologically valuable and active substances which have the property of beneficially acting on diseases or disorders due to defective or one-sided nourishment.

What I claim and desire to secure by Letters Patent is:

1. The process of obtaining vitamins which comprises the formation of a vitamin containing extract from cod-liver or cod-liver oil, and treating such extract with phospho-tungstic acid.

2. The process of obtaining vitamins which comprises the formation of a concentrated vitamin-containing extract from cod-liver oil, subjecting such extract to precipitation with phosphotungstic acid and then treating the resultant precipitate with acetone, and the residue from such treatment with lead acetate.

3. The process of obtaining vitamins which comprises the formation of a concentrated vitamin-containing extract from cod-liver oil, subjecting such extract to precipitation with phosphotungstic acid and then treating the resultant precipitate with acetone, and the residue from such treatment with lead acetate, and finally treating the resultant filtrate with hydrogen sulfid to remove excess of lead acetate and concentrating the thus purified solution.

In testimony whereof I hereunto affix my signature in the presence of two witnesses.

CASIMIR FUNK.

Witnesses:
LIZZIE U. SMITH,
JAMES O. POLLOCK.